United States Patent [19]

Ekman

[11] 4,453,748

[45] Jun. 12, 1984

[54] QUICK-COUPLING MEMBER

[76] Inventor: Kjell R. Ekman, Aberenrain 43, 6340 Baar, Switzerland

[21] Appl. No.: 342,549

[22] Filed: Jan. 25, 1982

[30] Foreign Application Priority Data

Feb. 16, 1981 [SE] Sweden ........................ 8101024

[51] Int. Cl.³ ........................ F16L 37/18; F16L 27/00

[52] U.S. Cl. ........................ 285/316; 285/276; 285/DIG. 22; 277/24

[58] Field of Search ....... 285/316, 276, 277, DIG. 22; 277/24; 137/614.03

[56] References Cited

U.S. PATENT DOCUMENTS

| | | | |
|---|---|---|---|
| 2,404,052 | 7/1946 | Ginter | 285/316 |
| 2,674,469 | 4/1954 | Earle et al. | 285/277 X |
| 2,877,437 | 3/1959 | Flanagan | 285/316 X |
| 4,005,735 | 2/1977 | Miyamoto | 138/96 R |

FOREIGN PATENT DOCUMENTS 7407156-4 5/1974 Sweden .

*Primary Examiner*—Richard J. Scanlon, Jr.
*Attorney, Agent, or Firm*—Pollock, Vande Sande & Priddy

[57] ABSTRACT

A first quick-coupling member (1) is adapted for introduction into and removal from a recess (2*a*) situated in a unit which can cooperate with the first coupling member, for example a second coupling member (2). A protective sleeve (4) is disposed on a body surface (1*d*, 1*e*) present at the front portions of the first coupling member. The protective sleeve is longitudinally displaceable in the longitudinal direction of the first coupling member, besides which the external diameter (d3) of the protective sleeve exceeds the internal diameter (D3) of the recess. In an initial position, the protective sleeve is conveyed forwards towards the front end (1*c*) of the first coupling member where it prevents the access of impurities to the front portions (1*d*) of the body surface. When the first coupling member is introduced into the recess, the protective sleeve is displaced longitudinally backwards on the first coupling member to expose its parts (1*b*) which is introduced into the recess. As a result the protective sleeve prevents the penetration of impurities via said body surface (1*d*, 1*e*) to a gap (s) present between the first coupling member and the unit and does so without the quick-coupling function of the coupling members being prevented.

20 Claims, 2 Drawing Figures

1a
1
1e
D2
4a
1f
5
d2
1d
5
4
D1
d3
6
2b
S
4c
3
1g
4
2
4b
D3
d1
1c
2a 1a
1
1e
D2
4a
1f
5
d2
1d
5
D1
4
d3
6
2b
S
4c
3
1g
2
4
4b
D3
d1
1c
2a
1e
4d
a'
D2
4e
7
4a'
4a''
4a
a
4a'''
4a'''
1f'''
1f
1f'
1f''
5
D1

QUICK-COUPLING MEMBER

TECHNICAL FIELD

The present invention relates to an improved, first quick-coupling member which is adapted to be introduced into and taken out of a recess situated in a unit which can cooperate with the first coupling member. This unit may comprise a second coupling member, in which case the first coupling member forms a so-called male member and the second coupling member a female member.

BACKGROUND ART

The present invention is intended to be able to be used inter alia on quick couplings which comprise male and female members which can be locked together. An example of a quick coupling where the invention is suitable for use is the so-called flat-nose quick-coupling according to the Swedish Patent Application No. 8000716-4, which corresponds to U.K. Pat. No. 2,068,069.

with the kind of quick coupling belonging to this category, it is important that impurities and foreign particles should not be able to penetrate into the system which is to be coupled by the quick coupling in question. It is also important that such impurities and particles should not penetrate, for example, into the locking member between the male and female members and endanger or shorten the operation or life thereof. In this connection, it is known to use so-called protective sleeves in connection with the female member of the coupling. Such a protective sleeve seals off an actual gap in the female member when this is not coupled so the male member. Furthermore, the protective sleeve is adapted for moving up when the members of the quick coupling are coupled together so that a suitable passage through the coupling can be formed for suitable media.

DISCLOSURE OF INVENTION

TECHNICAL PROBLEM

The known quick couplings are nevertheless still sensitive to the penetration of impurities despite said protective devices. It must be mentioned here that the couplings in question have to be able to be used under very difficult conditions from the contamination point of view, which means that careful wiping of the front parts of the male member for example must be effected before the coupling together of the quick-coupling members is carried out. Nevertheless, such wiping is not always effected sufficiently carefully, with the result that impurities present on the front parts of the male member penetrate into the gap between the male and female members and further towards the locking member for the members and the sealing element between them.

THE SOLUTION

The object of the device according to the present invention is to solve these problems inter alia; and what can primarily be regarded as characteristic of a device according to the invention is that a protective sleeve is disposed on a body surface present at the front parts of the first coupling member. The protective sleeve is longitudinally displaceable in the longitudinal direction of the first coupling member and has a diameter which exceeds the diameter of the recess in the female member. In an initial position, the protective sleeve is conveyed forwards towards the front end of the first coupling member where it prevents the access of impurities to the front parts of the body surface. When the first coupling member is introduced into the recess, the protective sleeve is displaced longitudinally backwards on the first coupling member to expose the parts which are introduced into the recess, as a result of which the protective sleeve prevents the penetration of impurities via said body surface to a gap existing between the first coupling member and the female member or unit, without preventing the quick-coupling function of the first coupling member.

Further developments of the idea of the invention relate to the more detailed construction of the protective sleeve which is to be constructed in the form of a thinwalled sleeve of light and cheap material, for example plastic material, such as polyethylene or a corresponding resilient plastic. In accordance with these further developments, a spring is also used as well as a mechanical stop which defines the initial position of the protective sleeve on the first coupling member. The longitudinal displacement of the sleeve in connection with the coupling of the first coupling member to the female member or unit in question is effected against the action of said spring. The stop member comprises a flange projecting out from the body surface and an inwardly projecting flange situated on the protective sleeve. The inwardly and outwardly projecting flanges are constructed so that the protective sleeve can be mounted on the first coupling member via its front end and be snapped over the outwardly projecting flange on the body surface. In one embodiment, the protective sleeve has substantially the shape of a hollow cylinder.

ADVANTAGES

As a result of the construction of the protective sleeve and the parts on the first coupling member affected by the invention, an effective protection against impurities is obtained. The coupling member can be used in a dirty environment without the wiping requirements being too high. Any impurities adhere to the outside of the protective sleeve and since the protective sleeve does not penetrate into the coupling when the male and female members are coupled together, the impurities in question cannot penetrate into the gap between the male and female members. In this embodiment, the sleeve is made at the back with a sweeping function which means that impurities which adhere to the body surface behind the protective sleeve when this is in its initial position are conveyed backwards by means of the sleeve. The construction of the protective sleeve also involves an economical manufacture of this and the material used in the sleeve can be selected so that the application of the protective sleeve to the first coupling member is comparatively simple.

As a result of using the special protective sleeve on the first coupling member or male member, an effective provention of the penetration of impurities is effected in connection with the coupling together, which leads to reliable operation of the coupling members and a long life thereof.

DESCRIPTION OF DRAWINGS

A form of embodiment at present proposed for a device according to the invention will be described below with reference to the accompanying drawings in which.

BEST MODE OF CARRYING OUT THE INVENTION

Figures 1, 2:
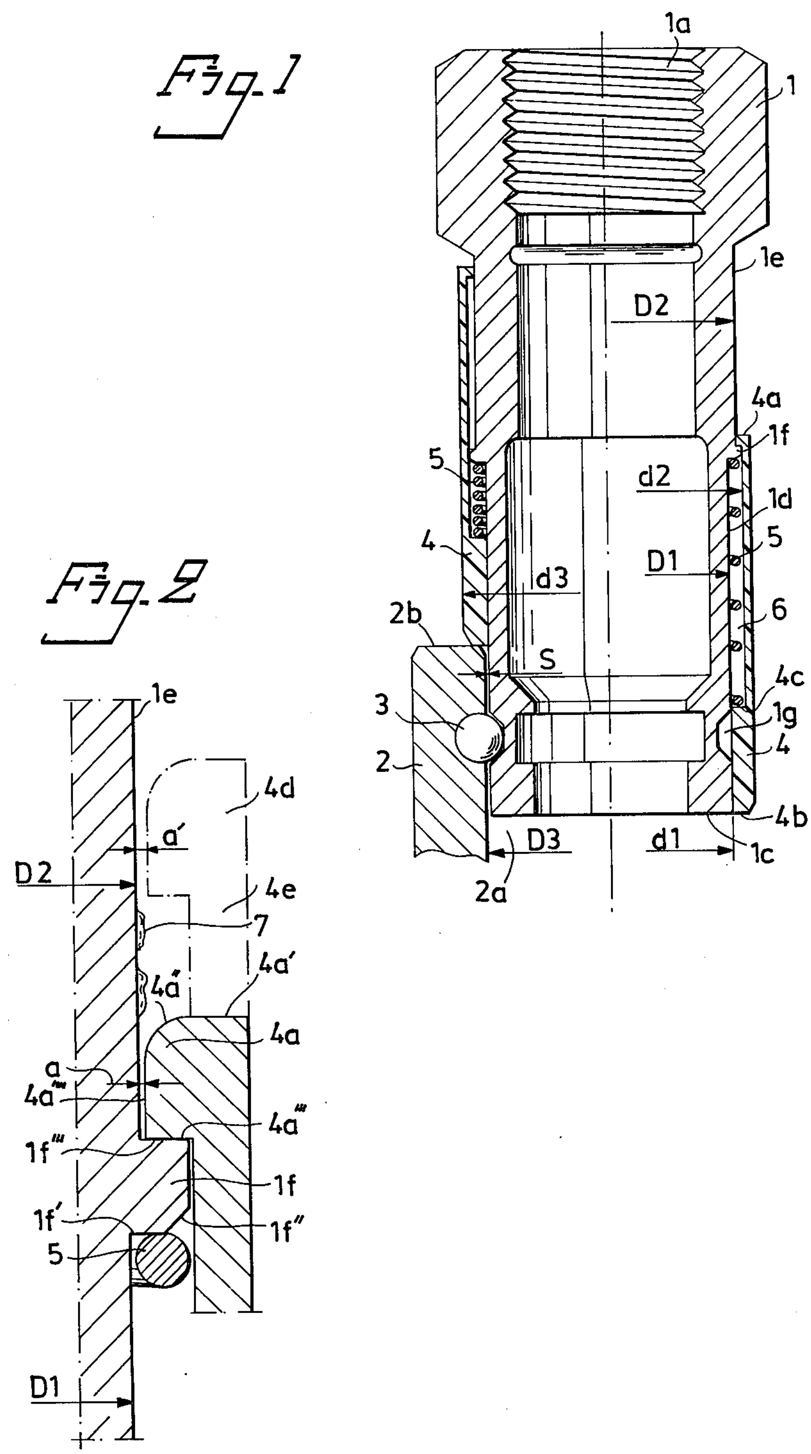
FIG. 1 shows, in longitudinal section, a first coupling member using the new protective sleeve, the righthand portion of the Figure showing a first operational case where the protective sleeve assumes an initial position and the left-hand portion of the Figure showing a second operational case where the protective sleeve is displaced longitudinally backwards on the first coupling member.
FIG. 2 shows in longitudinal section and on a larger shale parts of FIG. 1.

FIG. 1 aims at showing two operational stages by means of its right-hand and left-hand portions. The first coupling member has been allocated the numeral 1, while a unit which may consist of a second, female coupling member has been given the numeral 2. The first and second coupling members are included in a quick coupling and as an example of such a quick coupling, the one may be mentioned according to the Swedish Patent Application No. 8000716-4, which consists of a so-called flat-nose coupling. Since the operation of the coupling as such is assumed to be well known previously, it will not be described in more detail here, but it will merely be stated that the two members 1 and 2 can be locked to one another by means of locking members which may comprise locking balls 3. The first and second coupling members which, in the coupled position, are to couple through a passage for a medium also comprise internal, valves not shown here. The passage comprises a first passage 1*a* extending in the first coupling member. The second coupling member 2 may also comprise a recess 2*a* into which the first coupling member is adapted to be introduced. According to the left-hand half of FIG. 1, the front portion of coupling member 1 is introduced into the recess 2*a* in the second coupling member, besides which the first and second coupling members are mutually locked by means of locking balls 3.

The first coupling member comprises an exterior body surface which extends from the front end surface 1*c* of the first coupling member and backwards along the main portion of the first coupling member. This body surface may be regarded as comprising two body surfaces 1*d* and 1*e*. The first body surface has a diameter D1 which is smaller than the diameter D2 on the second body surface 1*e*. An outwardly projecting flange 1*f* is disposed at the transition between the component body surfaces.

Adjacent to and in contact with the component body surfaces 1*d* and 1*e* there is provided a protective sleeve 4 which is longitudinally displaceable in the longitudinal direction of the first coupling member. Thus the protective sleeve 4 can assume an initial position as shown in the right-hand portion of FIG. 1 and an actuated or longitudinally displaced position as shown in the left-hand portion of FIG. 1. At the back, the protective sleeve is provided with an inwardly projecting flange 4*a* which, in order to reach a distinct initial position in accordance with the right-hand portion of FIG. 1, can cooperate with the outwardly projecting flange 1*f* on the first coupling member. The protective sleeve essentially has the shape of a hollow cylinder, the outer surface of the hollow cylinder having substantially the same diameter along the whole longitudinal extent of the protective sleeve. On the other hand, the sleeve has two different internal diameters, a first portion having the internal diameter d1 and a second portion having the internal diameter d2. The first portion is provided at the front end of the sleeve which is adjacent to said front end surface 1*c* on the first coupling member. The diameter d1 is less than the diameter d2.. The protective sleeve which can be seen as a relatively thin-walled one, thus has two thicknesses of material along its extent, the thickness of material on the first portion being substantially twice as great as the thickness of material for the second portion. The protective sleeve is made of resilient material which means that the sleeve can be fitted to the first coupling member by being slid over the front parts of the first coupling member via its front parts 1*b* and snapped over the outwardly projecting flange 1*f*. In itself, it should be sufficient to make only the inwardly projecting flange 4*a* resilient. It is also possible to make both the sleeve and the inwardly projecting flange 4*a* resilient. In the present case, the inwardly projecting flange is integrated with the rest of the material of the sleeve, which may consist of plastic, for example polyethylene or the like. The first portion has a thickness of material which is about 1 mm, while the second portion consequently has a thickness of material of about 0.5 mm. The radial clearance between the members 1 and 2 is indicated by s.

The protective sleeve is further disposed on the first coupling member so that the first portion of the protective sleeve extends forwards and is adjacent to the end surface 1*c* of the first coupling member when the protective sleeve assumes its initial position. In this initial position, the first portion extends backwards so that it covers a depression 1*g* in the first coupling member via which depression 1*g* the first coupling member 1 cooperates with the locking balls 3. The front end surface 4*b* on the protective sleeve is adjacent to the end surface 1*c* on the first coupling meber 1. The first portion merges into the second portion via an internal shoulder surface 4*c*.

In order to achieve an automatic initial position in accordance with the right-hand poriton of FIG. 1 for the protective sleeve 4, a spring member is used which preferably has the form of a helical spring 5. This helical spring is inserted between a front surface on the outwardly projecting flange 1*f* and the internal shoulder surface 4*c* on the protective sleeve and serves to bias the sleeve toward the forward end of the coupling member 1. The helical spring has a comparatively large pitch so that a distinct initial position is obtained for the protective sleeve. In accordance with the above, the helical spring is inserted in a space 6 between the component body surface 1*d* on the first coupling member and the inner wall on the second portion of the protective sleeve. The protective sleeve prevents impurities from reaching the component body surface 1*d* and the extent of said first portion of the protective sleeve is such that this first portion covers the depression 1*g* and prevents the spring 5 from penetrating into said depression 1*g* which guarantees a reliable operation.

According to the left-hand portion of FIG. 1, the sleeve 4 is displaced longitudinally backwards when the first coupling member is introduced into the recess 2*a* in the second coupling member 2. The recess 2*a* has a diameter of D3 which is less than an external diameter d3 on the protective sleeve. In this manner, a front surface 2*b* on the second coupling member can cooperate with the front end surface 4*b* on the protective sleeve when the first and second coupling members are assembled. The protective sleeve is thus conveyed backwards by the assembly forces in the first and second coupling members against the action of said spring 5. during the longitudinal displacement backwards of the protective sleeve, the inwardly projecting flange 4*a* conveys backwards any impurities which may have adhered to the component body surface 1*e*. During the backward conveying movement and even after this, the outwardly projecting flage 1*f* serves as a guide member for the second portion of the protective sleeve.

When the first and second coupling members are separated, the protective sleeve is restored to its initial position by the spring 5.

FIG. 2 shows, on a larger scale, the formation of the outwardly projecting flange 1*f* and the inwardly projecting flange 4*a*. The first coupling member is made of stainless steel or the like, as are the second coupling member 2 and the locking balls 3. The outwardly projecting flange is integrated in the material of the first coupling member and therefore consists of stainless steel. The front surface of the outwardly projecting flange comprises a radial portion 1*f* and a tapered, for example bevelled or rounded, portion 1*f*'. The flange is further provided with an outer surface which is straight in the longitudinal direction and which merges into a radial back surface 1*f*''. The inwardly projecting flange 4*a* has a corresponding construction and thus has a radial back surface 4*a*, a tapered, for example bevelled or rounded, portion 4*a*'' and an inner surface which is straight in the longitudinal direction and which merges into a radial surface 4*a*'''. The tapered portions 1*f*' and 4*a*'' respectively facilitate the snapping of the sleeve over the outwardly projecting flange 1*f* when the protective sleeve is applied to the first coupling member. The opposite radial surfaces 1*f*'' and 4*a*''' respectively serve as stop surfaces and are effective as such because of their radial extents.

The radial clearance between the component body surface 1*e* and the inner surface 4*a*'''', which is straight in the longitudinal direction, is designated by a in FIG. 2. This clearance be selected within the range 0–0.3 mm, the spacing being selected depending on the degree of sweeping which is desired for existing impurities which are indicated by 7 in FIG. 2.

In an alternative form of embodiment, the protective sleeve can be provided with two inwardly projecting flanges, the second inwardly projecting flange being shown in broken lines and indicated by 4*d*. The inwardly projecting flange 4*d* can be selected with the same shape as the inwardly projecting flange 4*a* or may have a somewhat different shape in comparison with the last-mentioned inwardly projecting flange. The object of the second inwardly projecting flange 4*d* is that it should constitute a reserve function in the event the inwardly projecting flange 4*a* ceases to function, for example, as a result of breakage of material. The two inwardly projecting flanges are connected by a connection portion 4*e* which can be selected with a length which is suitable in each individual case. In the case shown, the spacing between the inner surface which is straight in the longitudinal direction on the inwardly projecting flange 4*d* has been disposed at a distance a' from the component body surface 1*e* which differs from the corresponding spacing a for the inwardly projecting flange 4*a*. The spacings a and *a*' respectively may also be selected substantially alike.

In accordance with the above account, the inwardly projecting flange 4*a* serves both as a stop member and as a sweeping member. When two inwardly projecting flanges are used disposed one behind the other, the one may normally constitute a stop member and the other a sweeping member even if the flange serving as a sweeping member is used as a stop member in the reserve case.

Most significative for the described embodiment is that the protective sleeve, at least at its back parts, is made of resilient plastic material or a corresponding resilient material and at its back parts, is formed with an inwardly projecting flange member which, when the sleeve is applied to the first coupling member, can snap over an outwardly projecting member on a body surface of the first coupling or male member and which thereafter, by cooperation with the outwardly projecting member on the male member, determines the initial position of the sleeve on the male member the protective sleeve carries, at its front portions, a portion which extends forwards to the end surface of the male or first coupling member in the initial position of the sleeve and the internal diameter of which substantially matches the diameter of the body surface. As a result there is a tight bearing of this portion of the protective sleeve against the relevant front portions of the body surface, as the sleeve prevents the accumulation of impurities and foreign particles on the parts of the male or first coupling member which can be introduced into the recess when the first coupling member assumes a position in which it is not introduced into the recess of the unit. Thus the protective sleeve prevents penetration of such impurities and foreign particles into the clearance present between the first coupling member and the female coupling member or unit when the male or first coupling member is introduced into the recess of the second or female coupling member.

The invention is not restricted to the form of embodiment shown by way of example above but can be subjected to modifications within the scope of the following patent claims and the idea of the invention. Thus it is conceivable that the male member 1 may cooperate with a female member 2 of another form than that shown.

INDUSTRIAL APPLICABILITY

The cooperating members of the protective sleeve and the coupling member, proposed according to the invention, are suitable for production in the rational manufacture of coupling sleeves. The protective members can, in themselves, be made separately in relation to said coupling members and be applied thereto in the factory. It is also possible to manufacture, supply and sell the protective sleeves separately in relation to the coupling members.

I claim:

1. An improved male quick-coupling member for insertion into and removal from a recess in a unit such as a female quick-coupling member, the recess having an internal diameter, said improved member comprising:

a body member having a front end surface and an exterior body surface extending rearwardly from said front end surface, said exterior body surface being sized to enter the recess in the female quick-coupling member;

a protective sleeve disposed around said body member, said sleeve having an internal diameter in contact with the front portion of said exterior body surface, said sleeve having an external diameter greater than the internal diameter of the recess in the female quick-coupling member, said sleeve being displaceable rearwardly along said body member to expose said front portion of said exterior body surface when said sleeve contacts the portion of the female quick-coupling member surrounding the recess during insertion of said male quick-coupling member into the recess; and means for biasing said sleeve to an initial position adjacent said front end surface so that said sleeve prevents access of impurities to said front portions of said exterior body surface prior to insertion of said male quick-coupling member into the recess, whereby said sleeve prevents penetration of impurities via said front portion of said exterior body surface into a clearance between said body member and the recess, without interfering with the quick-coupling function of said male quick-coupling member.

2. An improved male quick-coupling member according to claim 1, wherein said sleeve comprises means for sweeping rearwardly impurities present on the portion of said exterior body surface to the rear of said sleeve in said initial position.

3. An improved male quick-coupling member according to claim 1 or 2, wherein said body member comprises an outwardly projecting flange and said sleeve comprises an inwardly projecting flange, said flanges being positioned to engage to stop movement of said sleeve in said initial position.

4. an improved male quick-coupling member according to claim 3, wherein said sleeve further comprises an internal shoulder forward of said inwardly projecting flange and said means for biasing comprises a spring positioned between said outwardly projecting flange and said internal shoulder.

5. An improved male quick-coupling member according to claim 4, wherein said body member comprises a depression for engaging locking members in the recess and said internal shoulder is positioned rearwardly of said depression to prevent said spring from entering said depression in said initial position.

6. An improved male quick-coupling member according to claims 1 or 2, wherein said sleeve is formed from a resilient material such as plastic.

7. An improved male quick-coupling member according to claim 3 wherein said sleeve is formed from a resilient material such as plastic.

8. An improved male quick-coupling member according to claim 4 wherein said sleeve is formed from a resilient material such as plastic.

9. An improved male quick-coupling member according to claim 5 wherein said sleeve is formed from a resilient material such as plastic.

10. An improved male quick-coupling member according to claim 3, wherein said inwardly projecting flange is formed from a resilient material, whereby said sleeve can be slid over said exterior body surface and said inwardly projecting flange can be snapped over said outwardly projecting flange.

11. An improved male quick-coupling member according to claim 4, wherein said inwardly projecting flange is formed from a resilient material, whereby said sleeve can be slid over said exterior body surface and said inwardly projecting flange can be snapped over said outwardly projecting flange.

12. An improved male quick-coupling member according to claim 5, wherein said inwardly projecting flange is formed from a resilient material, whereby said sleeve can be slid over said exterior body surface and said inwardly projecting flange can be snapped over said outwardly projecting flange.

13. An improved male quick-coupling member according to claim 10, wherein said outwardly projecting flange and said inwardly projecting flange comprise cooperating tapered surfaces for facilitating snapping said inwardly projecting flange over said outwardly projecting flange and also comprise radially extending stop surfaces which engage in said initial position.

14. An improved male quick-coupling member according to claim 11, wherein said outwardly projecting flange and said inwardly projecting flange comprise cooperating tapered surfaces for facilitating snapping said inwardly projecting flange over said outwardly projecting flange and also comprise radially extending stop surfaces which engage in said initial position.

15. An improved male quick-coupling member according to claim 12, wherein said outwardly projecting flange and said inwardly projecting flange comprise cooperating tapered surfaces for facilitating snapping said inwardly projecting flange over said outwardly projecting flange and also comprise radially extending stop surfaces which engage in said initial position.

16. An improved male quick-coupling member according to claim 3, wherein said sleeve comprises a further, more rearwardly positioned inwardly projecting flange for providing a reserve stop in the event of failure of the more forwardly positioned inwardly projecting flange.

17. An improved male quick-coupling member according to claim 6, wherein said sleeve comprises a further, more rearwardly positioned inwardly projecting flange for providing a reserve stop in the event if failure of the more forwardly positioned inwardly projecting flange.

18. An improved male quick-coupling member according to claim 10, wherein said sleeve comprises a further, more rearwardly positioned inwardly projecting flange for providing a reserve stop in the event of failure of the more forwardly positioned inwardly projecting flange.

19. An improved male quick-coupling member according to claim 13, wherein said sleeve comprises a further, more rearwardly positioned inwardly projecting flange for providing a reserve stop in the event of failure of the more forwardly positioned inwardly projecting flange.

20. An improved male quick-coupling member according to claim 4, wherein said sleeve comprises a thin-walled cylinder having a forward, interior portion with a diameter for engaging said front portion of said exterior body surface and a rearward, interior portion with a larger diameter, said internal shoulder forming the transition between said forward and rearward portions; said exterior body surface comprises a larger diameter portion positioned rearward of said outwardly projecting flange and a smaller diameter portion positioned forward of said outwardly projecting flange; said rearward interior portion of said sleeve and said smaller diameter portion of said exterior body surface forming therebetween a space for said spring; and said outwardly projecting flange serving as a guide for said larger diameter portion of said sleeve.

* * * * *